United States Patent [19]

Sturza et al.

[11] Patent Number: 4,642,647
[45] Date of Patent: Feb. 10, 1987

[54] SIGNAL GENERATOR FOR RADIO NAVIGATION SYSTEM

[75] Inventors: Mark A. Sturza, Woodland Hills; Wayne L. Knitter, Chatsworth; Yi-Zen Wu, Woodland Hills, all of Calif.

[73] Assignee: Litton Systems, Inc., Beverly Hills, Calif.

[21] Appl. No.: 527,124

[22] Filed: Aug. 29, 1983

[51] Int. Cl.[4] .......................... G01S 1/10; H04B 7/19; H04L 25/38
[52] U.S. Cl. .................................... 342/415; 342/356; 375/115
[58] Field of Search ............... 343/356, 357, 415, 414, 343/407, 386, 451, 5 PN; 364/443, 449; 375/115

[56] References Cited

U.S. PATENT DOCUMENTS

| | | | |
|---|---|---|---|
| 4,426,712 | 1/1984 | Gorski-Popiel | 375/115 |
| 4,445,118 | 4/1984 | Taylor et al. | 343/356 |
| 4,485,383 | 11/1984 | Maher | 343/352 |

Primary Examiner—Theodore M. Blum
Assistant Examiner—Gregory C. Issing

[57] ABSTRACT

An improved signal generator and method for radio navigation in accordance with systems of the type in which location is determined in accordance with radio fixings with respect to multiple points of reference, each of such points providing a coded transmission. Multiple coded bit sequences are stored in an adddressable read only memory. Phantom signals comprising a plurality of coded sequences are generated by addressing the memory in accordance with preselected sequences. Further, predetermined phase shifts are applied to the coded sequences to facilitate signal detection and associated computational processes.

5 Claims, 2 Drawing Figures

SIGNAL GENERATOR FOR RADIO NAVIGATION SYSTEM

BACKGROUND OF THE DISCLOSURE

1. Field of the Invention

The present invention relates to radio navigation systems. More particularly, this invention pertains to apparatus for use in a radio navigation system of the type in which the phase difference between synchronized generated and received coded signals is utilized to determine range.

2. Description of the Prior Art

In the field of radio navigation, the current state of the art often favors the use of systems that utilize the phase comparison of coded signals to determine distance between a known point and a receiver. By making a number of distance determinations from the speed of light times the phase difference between a transmitted signal and a "synthetic" coded signal generated at the receiver, the two signals being synchronized in time, the requisite component distances can be obtained for subsequent determination of position using triangulation.

The accuracies of measurements obtained as above have often been impressive. This has led, in turn, to the employment of the above-described techniques in advanced satellite-based navigation systems such as the NAVSTAR Global Positioning System ("GPS"). In such a system, multiple satellites, the position of each of which is known, serve as points of origin of transmissions, each transmission comprising a uniquely-coded serial bit stream sent in repeating epochs. Distance determinations are made by observing the phase difference between the coded transmissions and the (identically-coded) synthetic signal generated at the receiver. Fixings of multiple satellites are made to survey the receiver's location in three-dimensional space. This requires the generation of multiple codes at the receiver and the sequential receipt and detection of the uniquely coded signal from multiple (usually four) satellite transmitters of known location. In the Navstar system, for instance, a potential of thirty-two (32) satellites of known location are available as points of reference for worldwide radio navigation.

The signals used in the Navstar system comprise pseudo-noise bit or "chip" sequences known as "C/A-codes". Each C/A-code consists of 1023 digital data bits arranged in a "Gold" code formed as the product of two 1023 bit pseudo-noise (PN) codes having a phase shift there between. Mathematically stated, $$C/A(n) = G_1(n) + G_2(n+N)$$

where N determines the phase shift between the $G_1$ and the $G_2$ codes. The $G_1$ and $G_2$ codes are, in turn, defined by corresponding generator polynomials $G_1(x)$ and $G_2(x)$:

$$G_1(x) = 1 + x^3 + x^{10}$$

$$G_2(x) = 1 + x^2 + x^3 + x^6 + x^8 + x^9 + x^{10}$$

A total of 1025 unique C/A-codes as above, exist, thirty-two (32) of which are utilized for the NAVSTAR signals. The phase shifts, N, defining the selected Navstar codes, are listed below:

| Code (Satellite) Number | Phase Shift (N) |
| --- | --- |
| 1 | 5 |
| 2 | 6 |
| 3 | 7 |
| 4 | 8 |
| 5 | 17 |
| 6 | 18 |
| 7 | 139 |
| 8 | 140 |
| 9 | 141 |
| 10 | 251 |
| 11 | 252 |
| 12 | 254 |
| 13 | 255 |
| 14 | 256 |
| 15 | 257 |
| 16 | 258 |
| 17 | 469 |
| 18 | 470 |
| 19 | 471 |
| 20 | 472 |
| 21 | 473 |
| 22 | 474 |
| 23 | 509 |
| 24 | 512 |
| 25 | 513 |
| 26 | 514 |
| 27 | 515 |
| 28 | 516 |
| 29 | 859 |
| 30 | 860 |
| 31 | 861 |
| 32 | 862 |

The C/A-codes are transmitted at a rate of 1.023 MBPS (mega bits per second); thus each code epoch repeats every millisecond.

In accordance with the power of ten components of the $G_1$ and $G_2$ polynomials, present day systems for generating and tracking coded phantom signals at the receiver are generally implemented by means of two ten stage shift register arrangements. Each coded epoch transmitted requires regeneration of a unique coded sequence that is associated with a preselected reference satellite. Each ten stage arrangement of shift registers may, of course, only be dedicated to a single one of the thirty-two C/A codes and, thus, multiple receiver modules (usually four) must be employed.

The use of ten stage registers and multiple receiver arrangements is costly, degrades system reliability and may result in excessive power consumption. More significantly, such systems are relatively slow in switching from one transmission to another. This can result in degraded tracking performance since large shifts in code phase between transmitted and phantom coded signals result in significant dead time (non-tracking) intervals, effectively reducing signal-to-noise ratio (SNR).

SUMMARY OF THE INVENTION

The foregoing and additional shortcomings and disadvantages of the prior art are addressed and overcome to a significant extent by the present invention which provides, in a first aspect, a multiple code generator for use in a radio navigation system of the type wherein location is determined in accordance with multiple spatially-distributed radio frequency signal fixings, each of such signal fixings comprising a radio frequency signal of preselected coding. The code generator includes a read only memory for storing a plurality of bit sequences, each of which comprises a predetermined code of the navigation system. Means are coupled to the read only memory for accessing preselected bit sequences and for applying a predetermined bit rate and phase shift to the sequences, the means for applying a redetermined bit rate and phase shift including a counter. Finally, means are provided for outputting the preselected bit sequences.

In a further aspect, the invention provides a method for generating multiple local replica codes for use in a radio navigation system of the G.P.S. type. Such method includes the step of storing a plurality of coded bit sequences in a read only memory. Preselected bit sequences are then accessed and output under the control of a counter.

The preceding and other advantages, features and aspects of the invention will become apparent from the detailed description of the invention that follows. This description accompanies and is supplemented by the drawing figures, like numerals of the description and figures referring to like features of the invention throughout.

DETAILED DESCRIPTION

Figure 1:
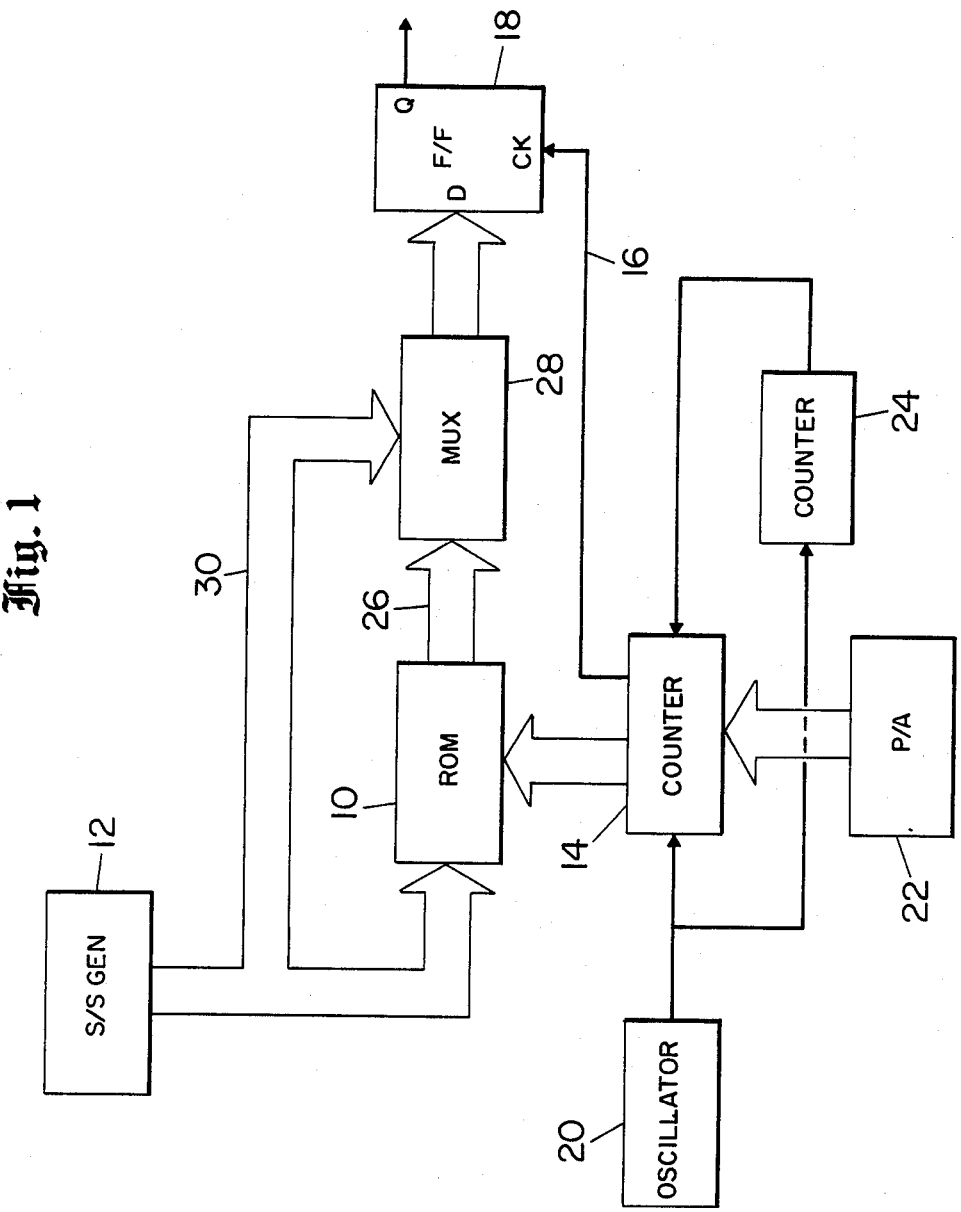
FIG. 1 is a circuit schematic of apparatus in accordance with the invention.

Turning now to the drawings, FIG. 1 is an electrical schematic diagram in accordance with the invention. The circuit illustrated therein provides improved sequential C/A-code generation and signal detection by utilizing the concept of table storage and look-up to increase system switching speeds. As a result of the concepts disclosed herein, switching speeds are effectively instantaneous, eliminating dead time and resulting, in turn, in substantially improved performance, reliability and economy.

The central element of the circuit is a read only memory (ROM) 10 for storing thirty-two (32) unique C/A-codes that identify the corresponding radio navigation system locations which, as mentioned above, may correspond to transmissions from earth satellites. As discussed, each stored code, in a NAVSTAR GPS system, will comprise a unique sequence of 1023 digital data bits. A 4K-by-8 ROM provides adequate memory for the codes.

Figure 2:
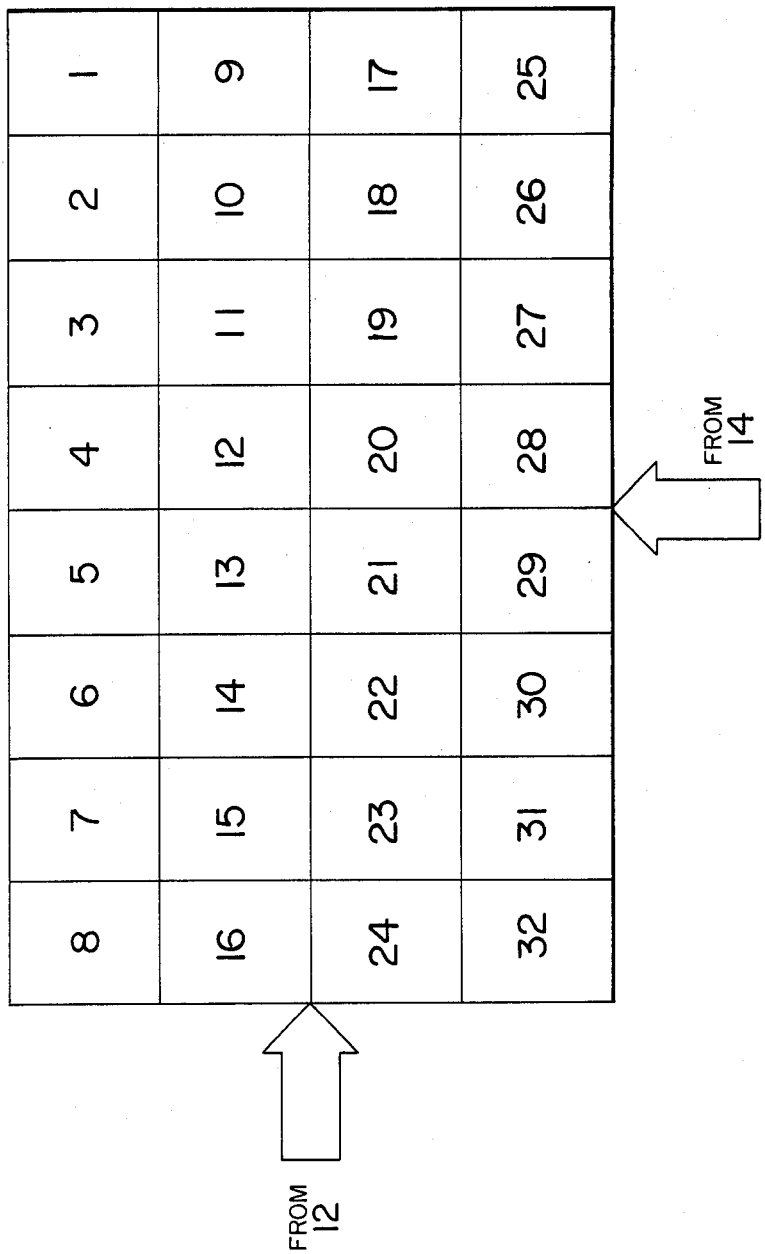
FIG. 2 is a diagram of the ROM data storage arrangement in accordance with the invention.

FIG. 2 is a diagram of the data storage format within the ROM 10. In this figure, a number within each "box" of the ROM matrix identifies a single one of the thirty-two codes and, hence, one of the thirty-two reference satellites. Referring to both FIG. 1 and FIG. 2, ROM 10 is addressed by twelve (12) data lines in hexidecimal format. Two of these data lines transfer a two bit word from signal select generator 12, a conventional, preferably programmable, digital apparatus for providing a preselected sequence of addresses chosen in accordance with the identities of the satellites being utilized for survey purposes. The other ten (10) data lines are provided by the parallel outputs of the ten stage counter 14. The output of the counter 14 is a sequence of an ordinal numbers identifing the 1023 bits of a C/A-code sequence. A conductor 16 transmits the state of the fourth stage of the counter 14 to the clock input of a D-type flip flop 18. An oscillator 20 clocks the counter 14 at 16.368 MHz so that the input supplied via the conductor 16 has a frequency of 1.023 MHz.

Programmable apparatus 22 supplies a fourteen (14) bit preset signal to the counter 14. This fourteen bit signal allows the sequence of ordinal numbers from the counter 14 to be altered and the phase of the generated C/A-code shifted in accordance with the estimated distance between the receiver and a given satellite. By minimizing the phase shift measured at the receiver, the amount of computational time devoted to search and station identification are minimized and the computational capacity of the system freed for other uses. By utilizing fourteen, rather than ten, bits, a one-sixteenth bit phase shift resolution is attained.

The output of the oscillator 20 is additionally applied, as a clock, to a divide-by-16,368 counter 24. The final (fourteenth) stage of the counter 24 provides a 1 millisecond "load" strobe signal to the counter 14. The load strobe resets the counter 14 at the beginning of each 1 millisecond epoch.

The output of the ROM 10 comprises eight (8) C/A-codes transmitted over the eight-conductor bus 26. The eight outputs of the ROM 10 consist of eight unique C/A-codes of identical ordinal sequence (since each of the columns of FIG. 2 is identically addressed). The set of eight codes is selected from a single row of FIG. 2 determined in accordance with the two bit word input to the ROM 10 from the signal select generator 12.

The eight parallel outputs are applied to a multiplexer 28. An individual one of the eight C/A-codes is chosen in accordance with a three (3) bit signal transmitted over the bus 30 generated by means of the signal select generator 12. The C/A-code data stream selected is applied to the D-input port of the flip flop 28 whereupon it is clocked, as system output, at a rate of 1.023 MHz for comparison in phase with the detected signal of identical coding.

By proper programming of the signal select generator 12, a preselected sequence of C/A-codes is output by the invention in extremely rapid succession. Further, each of the successive code outputs may be individually shifted in phase in accordance with the approximate distance from receiver to satellite, or other reference station, by (programmable) sequencing of the preset output of the apparatus 22. It will be readily appreciated by those in the art that all apparatus indicated in this disclosure to be programmable may in fact comprise a single piece of hardware, such as a multipurpose system digital computer. It will be further appreciated that additional functions as discussed may be incorporated into such programmable in a variety of manners, including standard peripherals and software.

Thus it is seen that there has been provided improved apparatus and a method for use with radio navigation systems of the type in which distance is determined in accordance with observed phase shifts between received and phantom coded signals. By incorporating apparatus in accordance with the invention into such a system, gains in accuracy, economy and reliability are readily attained.

While the invention has been described with reference to its presently preferred embodiment, it is not so limited in scope. Rather it is intended that all variations and embodiments, and their equivalents, falling within the scope of the following set of claims shall serve to define the invention.

What is claimed is:

1. A multiple code generator for use in a radio navigation system of the type wherein location is determined in accordance with multiple spatially-distributed radio frequency signal fixings, each of said signal fixings comprising a radio frequency signal of preselected coding, said code generator comprising, in combination:
- a. a read only memory for storing a plurality of bit sequences, each of said sequences comprising a predetermined code of said navigation system;
- b. means coupled to said read only memory for accessing preselected bit sequences;
- c. means for applying a predetermined bit rate and phase shift to said sequences, said means including a counter; and
- d. means for outputting said preselected bit sequences.

2. A multiple code generator as defined in claim 1 wherein said means for applying a predetermined bit rate and phase shift further includes means for presetting said counter.

3. A multiple code generator as defined in claim 2 wherein the information applied to said counter exceeds the information applied to said read only memory so that fractional code phase shifts may be attained.

4. A method for generating multiple local replica codes for use in a radio navigation system of the GPS type comprising the steps of:
- a. storing a plurality of coded bit sequences in a table in a read only memory wherein each of said sequences is a pseudo-noise sequence,
- b. accessing preselected bit sequences,
- c. outputting said preselected bit sequences under the control of a counter and presetting said counter so that said sequences are output with predetermined phase shifts.

5. A method as defined in claim 4 including the step of arranging said counter so that the phases of said sequences can be shifted by a fraction of a bit.

* * * * *